(12) United States Patent
Ponniah et al.

(10) Patent No.: US 11,151,573 B2
(45) Date of Patent: Oct. 19, 2021

(54) INTELLIGENT CHARGEBACK PROCESSING PLATFORM

(71) Applicant: Accenture Global Solutions Limited, Dublin (IE)

(72) Inventors: Ramakrishnan Ponniah, Chennai (IN); Pramod Nair, West Windsor, NJ (US); Ankit Suneja, Pune (IN); Rajeev D. Nair, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 368 days.

(21) Appl. No.: 15/827,584

(22) Filed: Nov. 30, 2017

(65) Prior Publication Data

US 2019/0164159 A1    May 30, 2019

(51) Int. Cl.
  *G06Q 20/40*   (2012.01)
  *G06K 9/62*   (2006.01)
  *G06N 20/00*   (2019.01)

(52) U.S. Cl.
  CPC ......... *G06Q 20/407* (2013.01); *G06K 9/6269* (2013.01); *G06K 9/6278* (2013.01); *G06K 9/6282* (2013.01); *G06N 20/00* (2019.01); *G06Q 20/405* (2013.01)

(58) Field of Classification Search
  CPC .. G06Q 20/407; G06Q 20/405; G06K 9/6269; G06K 9/6278; G06K 9/6282; G06N 20/00; G06N 3/08; G06N 20/20; G06N 7/005; G06N 5/003; G06N 20/10
  See application file for complete search history.

(56) References Cited

U.S. PATENT DOCUMENTS 5,819,226 A    10/1998  Gopinathan et al.
10,705,796 B1 *   7/2020  Doyle ................ G06F 7/08
(Continued)

FOREIGN PATENT DOCUMENTS

WO    WO-2018097653 A1 *  5/2018  ............ G06Q 30/06

OTHER PUBLICATIONS

Rajaraman, Anand, and Jeffrey David Ullman. Mining of massive datasets. Cambridge University Press, 2011 (Year: 2014).*
(Continued)

*Primary Examiner* — Mike Anderson
*Assistant Examiner* — James H Miller
(74) *Attorney, Agent, or Firm* — Harrity & Harrity, LLP

(57) ABSTRACT

A device may receive first information relating to a first set of transactions and a first set of chargebacks associated with the first set of transactions; process the first information to generate a processed data set; train a model to perform classification of the first set of chargebacks, where the model is to receive, as input, information relating to transactions and at least one chargeback, and where the model is to output information identifying a classification of the at least one chargeback; receive second information identifying a second set of transactions and a second set of chargebacks associated with the second set of transactions, where the second information is received from multiple, different sources; determine a classification of the second set of chargebacks using the model and based on the second information; and perform an action based on the classification of the second set of chargebacks.

20 Claims, 7 Drawing Sheets

(56) References Cited

U.S. PATENT DOCUMENTS

| | | | |
|---|---|---|---|
| 2002/0139837 A1* | 10/2002 | Spitz | G06Q 40/025 |
| | | | 235/375 |
| 2007/0106582 A1 | 5/2007 | Baker et al. | |
| 2007/0233603 A1* | 10/2007 | Schmidgall | G06Q 30/06 |
| | | | 705/51 |
| 2012/0022945 A1 | 1/2012 | Falkenborg et al. | |
| 2012/0158585 A1* | 6/2012 | Ganti | G06Q 20/4016 |
| | | | 705/44 |
| 2014/0108238 A1 | 4/2014 | Boding | |
| 2014/0180974 A1* | 6/2014 | Kennel | G06Q 40/025 |
| | | | 706/12 |
| 2016/0300214 A1* | 10/2016 | Chaffin | G06Q 20/22 |
| 2017/0286962 A1* | 10/2017 | Lai | G06Q 20/24 |
| 2017/0330196 A1* | 11/2017 | Larko | G06Q 30/016 |
| 2019/0005408 A1* | 1/2019 | Tolpin | G06Q 30/06 |
| 2019/0012733 A1* | 1/2019 | Gorman | G06N 20/00 |

OTHER PUBLICATIONS

Rajaraman, Anand, and Jeffrey David Ullman. Mining of massive datasets. Cambridge University Press, 2014 (Year: 2014).*

* cited by examiner

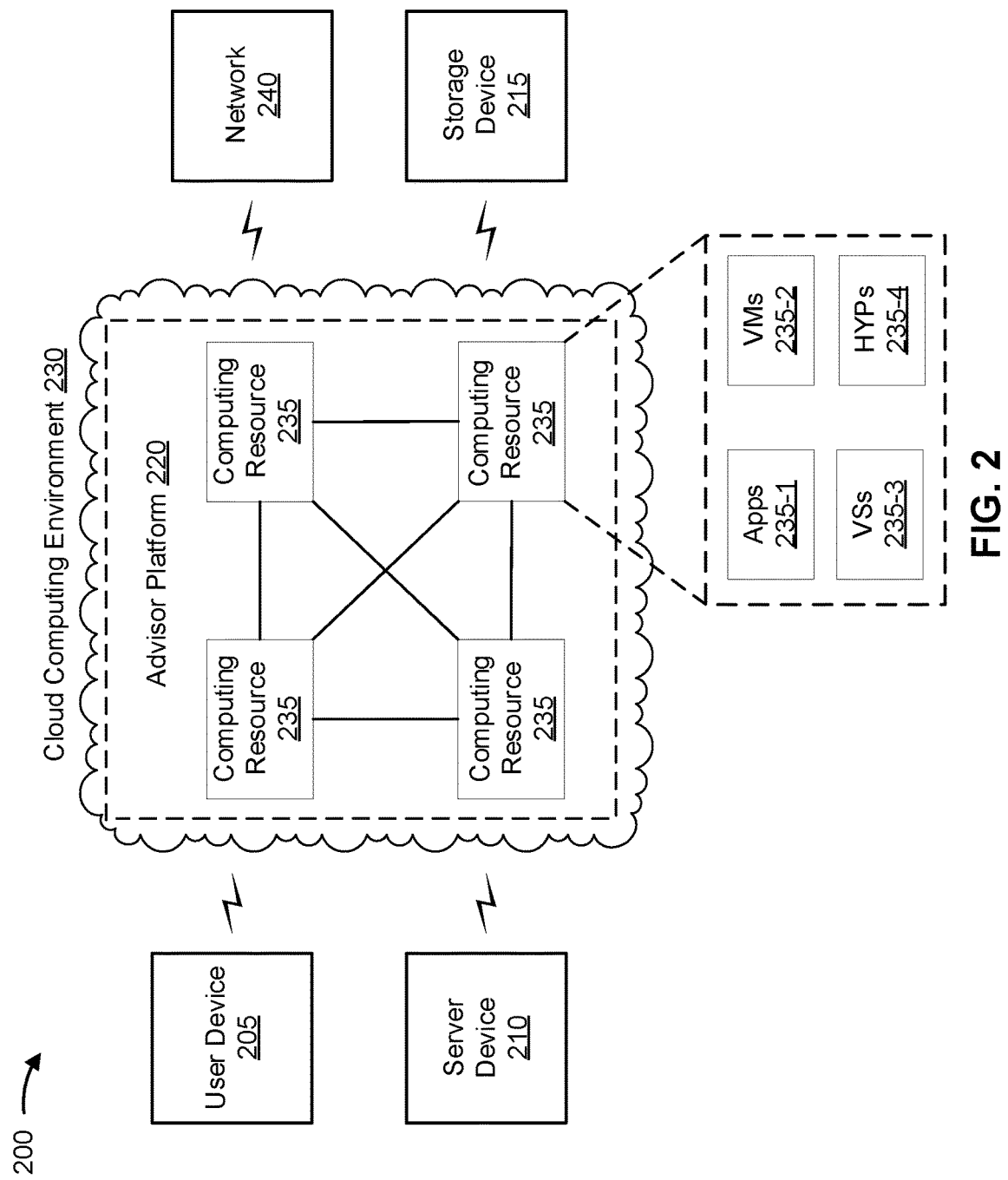

INTELLIGENT CHARGEBACK PROCESSING PLATFORM

BACKGROUND

A payment card issuing organization, such as a bank, a credit card issuer, and/or the like, may provide certain services for customers and merchants. Some services, such as a transaction dispute processing service, may require may require input of multiple, different types for effective processing (e.g., documents, natural language input, transactional information, etc.). Chargeback is a process step within such a service, and is the process used by a card issuer to recover a customer-disputed transaction from a merchant.

SUMMARY

A device may include one or more processors to receive first information relating to a first set of transactions and a first set of chargebacks associated with the first set of transactions; process the first information to generate a processed data set; train a model, using the processed data set, to perform classification of the first set of chargebacks, where the model is to receive, as input, information relating to transactions and at least one chargeback, and where the model is to output information identifying a classification of the at least one chargeback; receive second information identifying a second set of transactions and a second set of chargebacks associated with the second set of transactions, where the second information is received from multiple, different sources; determine a classification of the second set of chargebacks using the model and based on the second information; and perform an action based on the classification of the second set of chargebacks.

A method may include: receiving, by a device, information relating to a set of transactions and one or more chargebacks associated with the set of transactions, where the information is received from multiple, different sources; processing, by the device, the information to generate a processed data set, where the processing includes at least one of: performing natural language processing of the information, preprocessing of the information, or cleansing the information; receiving, by the device, a model to perform classification of the one or more chargebacks based on the processed data set, where the model is to receive, as input, the processed data set, and where the model is to output information identifying a classification of the one or more chargebacks; determining, by the device, a classification of the one or more chargebacks using the model; and performing, by the device, an action based on the classification of the one or more chargebacks.

A cloud computing platform may include one or more devices to: receive first information relating to a first set of transactions and a first set of chargebacks associated with the first set of transactions, where the first information is received from multiple, different sources; process the first information to generate a processed data set; obtain a model, trained using the processed data set, to perform classification of the first set of chargebacks, where the model is to receive, as input, information relating to transactions and at least one chargeback, and where the model is to output information identifying a classification of the at least one chargeback; receive second information identifying a second set of transactions and a second set of chargebacks associated with the second set of transactions; determine a classification of the second set of chargebacks using the model and based on the second information; and perform an action based on the classification of the second set of chargebacks.

BRIEF DESCRIPTION OF THE DRAWINGS

FIG. 2 is a diagram of an example environment in which systems and/or methods, described herein, may be implemented;

DETAILED DESCRIPTION

Figure 1A:
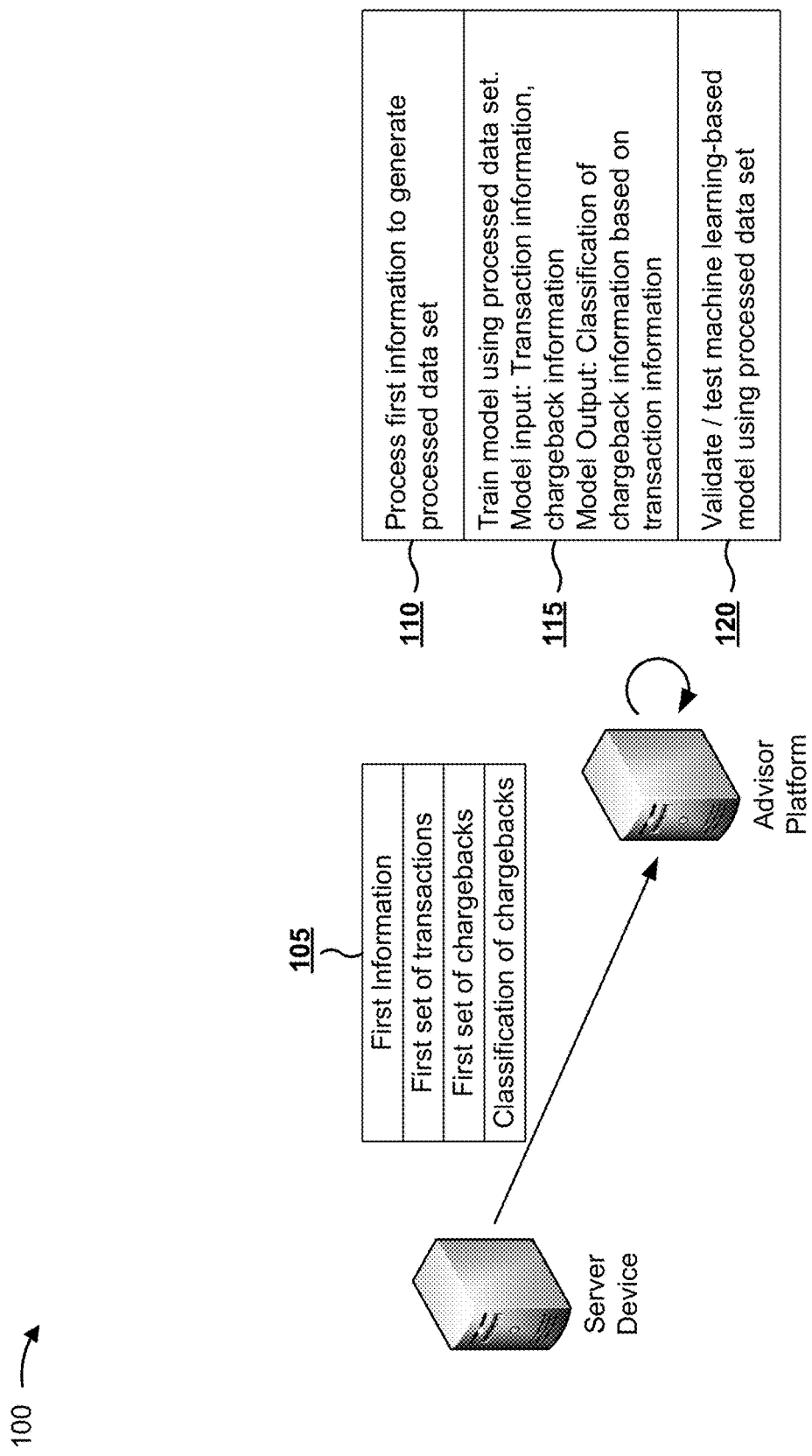
FIGS. 1A and 1B are diagrams of an overview of an example implementation described herein.

The following detailed description of example implementations refers to the accompanying drawings. The same reference numbers in different drawings may identify the same or similar elements.

A cardholder (e.g., a user of a credit card, debit card, or other payment system) may perform a payment associated with a transaction. The cardholder can request a chargeback if the cardholder believes that the transaction was improperly handled by a payee or merchant counterparty of the transaction. The cardholder may initiate the chargeback by contacting an issuing bank and filing a substantiated complaint regarding one or more debit items associated with the transaction. Chargebacks also provide a means for reversal of unauthorized transfers due to identity theft. Chargebacks can also occur as a result of friendly fraud, where the transaction was authorized by the cardholder but the cardholder later attempts to fraudulently reverse the transaction.

An issuing bank may encounter various difficulties with processing chargebacks. These difficulties may not be easily resolved by a human actor. For example, the substantiation of a chargeback request may involve lengthy documents in natural language, which must be evaluated in view of procedures and regulations that are frequently revised. Furthermore, processing a chargeback may involve a high skill level that requires extensive training and judgment-based decision making on the part of the actor. The costs and overhead associated with training and maintaining employees to process chargebacks may become prohibitive as the volume of chargebacks increases. Still further, a human may have difficulty identifying trends, correlations, and relationships between different data sets, which may impede identification of fraudulent behavior and/or the like.

Some implementations described herein use a machine learning-based model, such as a classification model, to identify the appropriate chargeback reason code & condition code (e.g., sub-category below reason code) for the disputed transaction. For example, some implementations described herein may train the machine learning-based model based on a machine learning approach. The machine learning-based model may receive, as input, information regarding chargebacks and transactions associated with the chargebacks. The machine learning-based model may output information identifying classifications for the chargebacks. For example, a classification may identify a chargeback as likely fraudulent, as associated with an error by a merchant, as associated with a hacking or identity theft incident, and/or the like. By using a machine learning approach, correlations and relationships between chargebacks and transactions that would likely not be apparent to a human reviewer may be identified.

In this way, a rigorous and automatic approach is used to perform evaluation and classification of chargebacks, which improves efficiency and accuracy of classification of chargebacks. Furthermore, using automated and computer-based techniques enables the identification of trends, correlations, and relationships between data regarding chargebacks, which may provide for identification of fraudulent activities that a human reviewer may have difficulty identifying. Still further, the usage of machine learning enables continuous improvement of processing techniques, which improves adaptability of implementations described herein in the face of changing chargeback characteristics and regulations. Furthermore, some implementations described herein may perform processing for large volumes of data (e.g., millions, billions trillions, etc. of data points) and may efficiently process the data, thereby conserving processing resources and processing volumes of data that may be inefficient or impossible for a human actor to objectively process.

Figure 1B:
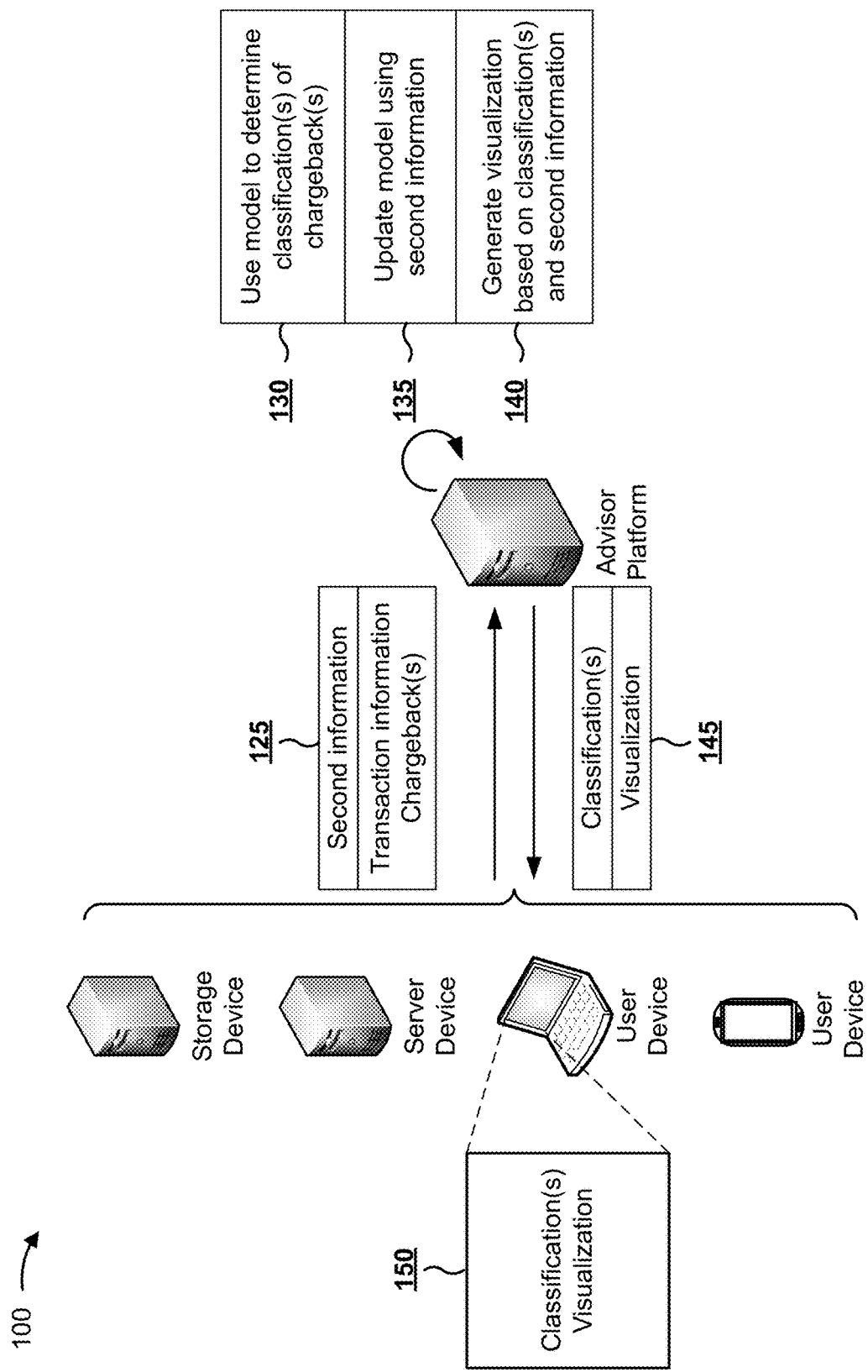

FIGS. 1A and 1B are diagrams of an overview of an example implementation 100 described herein. As shown in FIG. 1A, example implementation 100 may include an advisor platform and a server device from which the advisor platform may obtain information associated with transactions (e.g., information related to chargebacks associated with the transactions). As shown by reference number 105, the advisor platform may receive first information. In some implementations, the advisor platform may fetch or obtain the first information. In some implementations, the first information may be received from the server device or another device (e.g., a user device, a storage device, etc.).

In some implementations, the first information may include information regarding a first set of transactions (e.g., card number, card type, transaction amount, item/service purchased, etc.). In some implementations, the first information may include information regarding a first set of chargebacks. The first set of chargebacks may be associated with the first set of transactions (e.g., a chargeback may dispute one or more transactions of the first set of transactions).

In some implementations, the first information may include information regarding classifications of chargebacks. In this case, classification may be based on reason codes and condition codes (e.g., sub-categories under reason codes) associated with the chargebacks. For example, when processing chargebacks, a reason code may be assigned that describes a motivation behind a chargeback dispute (e.g., services not provided, cancelled recurring transaction, installment billing dispute, defective merchandise, etc.). The advisor platform may receive the first information to train a machine learning-based model using the first information. For example, the advisor platform (or another device or platform) may train the machine learning-based model to assign a classification (e.g., reason code) for a chargeback based on transaction information and chargeback information associated with the chargeback.

As further shown in FIG. 1A, and as shown by reference number 110, the advisor platform may process the first information to generate a processed data set. For example, the advisor platform may remove spaces, remove redundant characters, perform formatting, perform decompression, perform natural language processing, perform de-duping, perform sanitizing, and/or the like. The procedures for generating a processed data set are described in more detail elsewhere herein.

As further shown in FIG. 1A, and by reference number 115, the advisor platform may train a machine learning-based model using the processed data set. For example, the advisor platform may train the machine learning-based model using a machine learning algorithm or a similar technique, as described in more detail elsewhere herein. In some implementations, the advisor platform may train the machine learning-based model using a training data set of transaction information (e.g., the first transaction information), chargeback information (e.g., the first chargeback information), classification information (e.g., classifications associated with the first chargeback information), and/or other information, such as regulatory information, rules, customer feedback, and/or the like. In some implementations, inputs to the machine learning-based model may include transaction data, chargeback data, and/or the like. In some implementations, outputs of the machine learning-based model may include classification information based on the transaction data and chargeback data.

As further shown in FIG. 1A, and by reference number 120, in some implementations, the advisor platform may validate or test the machine learning-based model using the processed data set. For example, the advisor platform may divide the processed data set into subsets of a training data set, a validation data set, and/or a test data set. In this case, the advisor platform may use validation data to select a best model of one or more models trained using the training data set, and may use the testing data set to determine a generalization error of the selected model. The generalization error may indicate how accurately the model is able to predict an outcome value for previously unseen data, and may be used to assess accuracy of the model.

As shown in FIG. 1B, and by reference number 125, the advisor platform may receive second information. For example, the advisor platform may obtain or fetch the second information. As shown, the advisor platform may receive the second information from multiple, different sources. In this case, the multiple, different sources may include user devices, server devices, storage devices, and/or the like. In some implementations, the second information may include second transaction information regarding one or more chargebacks (shown as chargeback(s)). The advisor platform may receive the second information to determine a classification for the one or more chargebacks using the machine learning-based model.

As further shown in FIG. 1B, and by reference number 130, the advisor platform may determine classification information for one or more chargebacks based on the second information and using the machine learning-based model. In some implementations, the advisor platform may store the machine learning-based model. In some implementations, the advisor platform may receive the machine learning-based model from another device. In some implementations, the advisor platform may input second information to the machine learning-based model, and the machine learning-based model may output classification information. In this way, the advisor platform leverages card transaction information, customer dispute information, regulatory information, and historical data to provide an accurate recommendation with regard to the classification information.

As further shown in FIG. 1B, and as shown by reference number 135, the advisor platform may update the machine learning-based model based on the second information. For example, the advisor platform may adjust the machine learning-based model based on whether classifications associated with second information are accurate (e.g., based on user feedback after providing the classification information to an administrator or user). In this way, the advisor platform may exercise an ongoing learning capability, which may reduce maintenance costs and improve performance when applicable regulations change in comparison to a hard-coded rules based approach.

As further shown in FIG. 1B, and as shown by reference number 140, the advisor platform may perform another action based on the classification information and/or the second information. For example, as shown, the advisor platform may generate a visualization. For example, the visualization may identify classifications (e.g., reason codes) determined based on the second information, and may identify relationships between the classifications and/or the second data. In this case, the advisor platform may identify particular attributes of second information that contributed to the classification, may identify related chargebacks or related second information, and/or the like. In some implementations, the advisor platform may perform other actions, such as an automatic action relating to the chargeback, as described in more detail below.

As further shown in FIG. 1B, and as shown by reference number 145, the advisor platform may provide the classification(s) and/or visualization to one or more devices. For example, the advisor platform may provide an intelligent recommendation on a best-suited classification (e.g., reason code) for a chargeback, which may improve chargeback effectiveness. As shown by reference number 150, the advisor platform may provide the classification(s) to a user device, which provides the visualization for display (e.g., to a user or administrator).

In some implementations, the advisor platform may provide an interface for selecting a classification, reason code, and/or the like. Additionally, or alternatively, the advisor platform may receive input regarding the classification in a natural language form, and may interpret the input using a natural language technique. In this way, the advisor platform interprets natural language and interacts (e.g., in text and/or voice) to provide a human-like advisor experience.

In this way, a rigorous and automatic approach is used to perform evaluation and classification of chargebacks, which improves efficiency and accuracy of classification of chargebacks. Furthermore, using automated and computer-based techniques enables the identification of trends, correlations, and relationships between data regarding chargebacks, which may provide for identification of reason codes, fraudulent activities, or other characteristics that a human reviewer may have difficulty identifying. Still further, the usage of machine learning enables continuous improvement of processing techniques, which improves adaptability of implementations described herein in the face of changing chargeback characteristics and regulations. Furthermore, the usage of the machine learning-based model to determine classifications of chargebacks may conserve processor resources that would otherwise be used to determine the classifications using a less accurate method, such as a coded rules-based method. Also, the usage of a cloud environment to gather and process data from multiple, different sources, including natural language sources, improves efficiency of data collection and processing in comparison to a tool that requires manual or structured input.

As indicated above, FIGS. 1A-1B are provided merely as an example. Other examples are possible and may differ from what was described with regard to FIGS. 1A-1B.

FIG. 2 is a diagram of an example environment 200 in which systems and/or methods described herein may be implemented. As shown in FIG. 2, environment 200 may include a user device 205, a server device 210, a storage device 215, an advisor platform 220 hosted within a cloud computing environment 230, and a network 240. Devices of environment 200 may interconnect via wired connections, wireless connections, or a combination of wired and wireless connections.

User device 205 includes one or more devices capable of receiving, generating, storing, processing, and/or providing information, such as information described herein. For example, user device 205 may include a computing device (e.g., a desktop computer, a laptop computer, a tablet computer, a handheld computer, a server, etc.), a mobile phone (e.g., a smart phone, a radiotelephone, etc.), or a similar device. In some implementations, user device 205 may receive information from and/or transmit information to server device 210 and/or advisor platform 220.

Server device 210 includes one or more devices capable of receiving, generating, storing, processing, and/or providing information, such as information described herein. For example, server device 210 may include a computing device, such as a server, a desktop computer, a laptop computer, a tablet computer, a handheld computer, or a similar device.

Storage device 215 includes one or more devices capable of receiving, generating, storing, processing, and/or providing information, such as information described herein. For example, storage device 215 may include a computing device, such as a server, a desktop computer, a laptop computer, or a similar device. In some aspects, storage device 215 may be included in or associated with server device 210.

Advisor platform 220 includes one or more devices capable of performing processing of information described herein. For example, advisor platform 220 may include a server or a group of servers. In some implementations, as shown, advisor platform 220 may be hosted in cloud computing environment 230. Notably, while implementations described herein describe advisor platform 220 as being hosted in cloud computing environment 230, in some implementations, advisor platform 220 may not be cloud-based (i.e., may be implemented outside of a cloud computing environment) or may be partially cloud-based.

Cloud computing environment 230 includes an environment that hosts advisor platform 220. Cloud computing environment 230 may provide computation, software, data access, storage, etc. services that do not require end-user knowledge of a physical location and configuration of system(s) and/or device(s) that hosts advisor platform 220. As shown, cloud computing environment 230 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host advisor platform 220. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 205, server device 210, and/or storage device 215. Application 235-1 may eliminate a need to install and execute the software applications on these devices. For example, application 235-1 may include software associated with advisor platform 220 and/or any other software capable of being provided via cloud computing environment 230. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of another device (e.g., user device 205, server device 210, and/or storage device 215), and may manage infrastructure of cloud computing environment 230, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
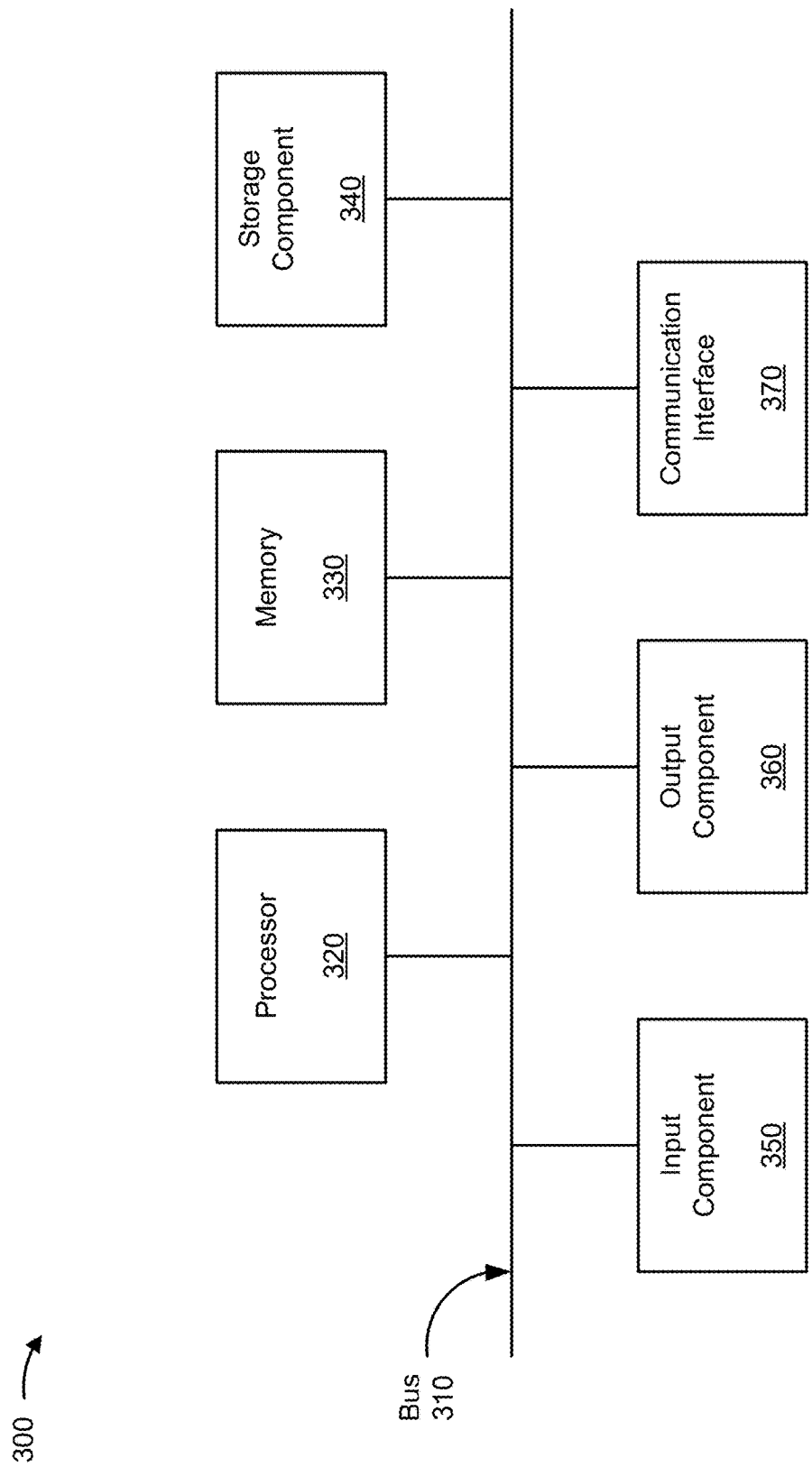
FIG. 3 is a diagram of example components of one or more devices of FIG. 2.

FIG. 3 is a diagram of example components of a device 300. Device 300 may correspond to user device 205, server device 210, storage device 215, and/or advisor platform 220. In some implementations, user device 205, server device 210, storage device 215, and/or advisor platform 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
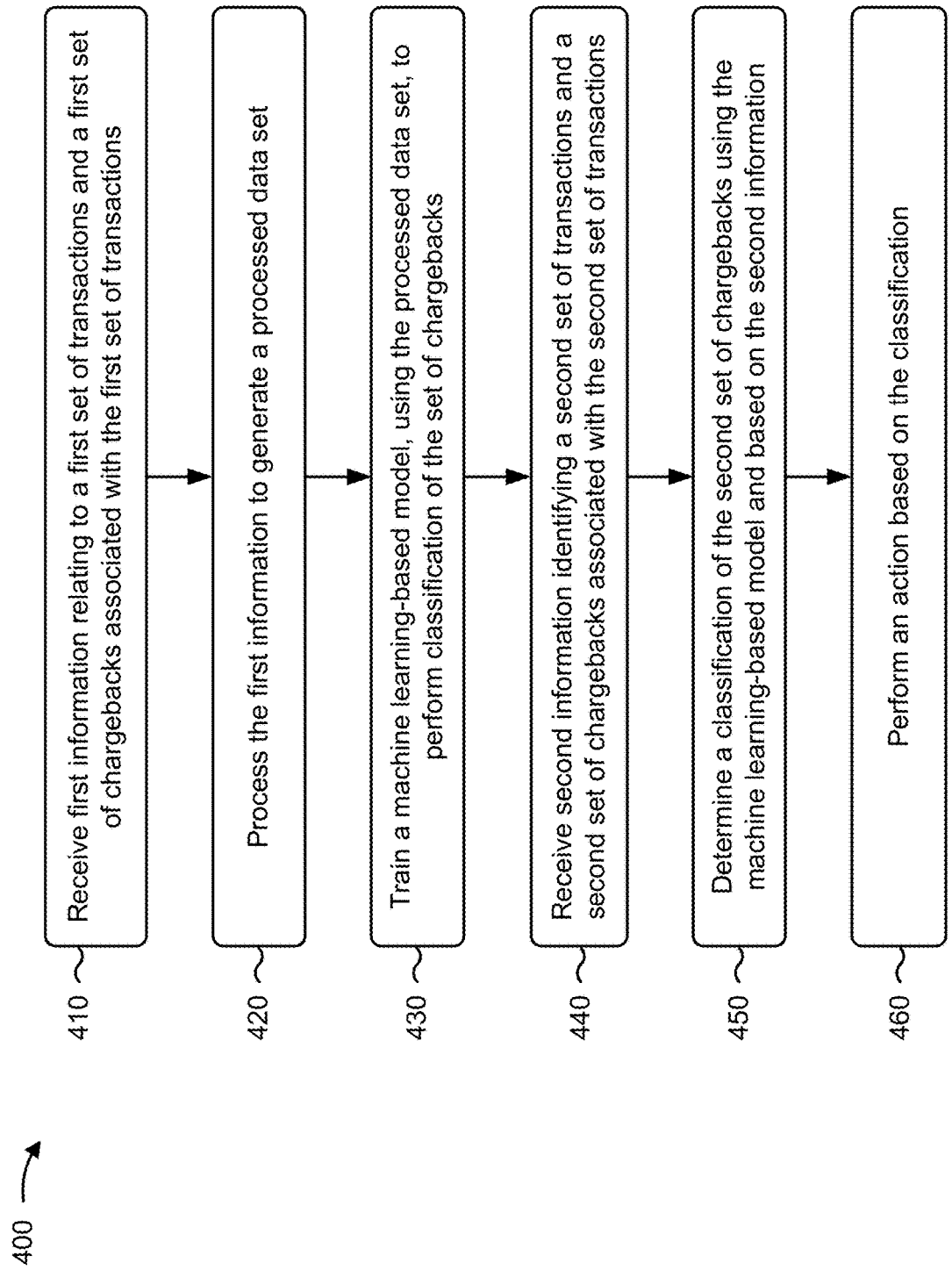
FIG. 4 is a flow chart of an example process for determining classifications of chargebacks using a model generated using a machine learning technique.

FIG. 4 is a flow chart of an example process 400 for determining a classification for a chargeback using an advisor platform. In some implementations, one or more process blocks of FIG. 4 may be performed by advisor platform 220. In some implementations, one or more process blocks of FIG. 4 may be performed by another device or a group of devices separate from or including advisor platform 220, such as user device 205, server device 210, and/or storage device 215.

As shown in FIG. 4, process 400 may include receiving first information relating to a first set of transactions and a first set of chargebacks associated with the first set of transactions (block 410). For example, advisor platform 220 may receive first information relating to a first set of transactions and a first set of chargebacks associated with the first set of transactions. In some implementations, the first information may be a set of historical transaction information and/or chargeback information to be used to train a machine learning-based model. The model may identify classifications for chargebacks based on transaction information and chargeback information associated with the chargebacks. In this way, chargeback classification accuracy is improved, thereby improving chargeback cycle time and reducing costs. Furthermore, the machine learning-based model may conserve processor resources that would otherwise be used to execute a less accurate rules-based or manually-defined classification procedure.

In some implementations, the first information may include transaction information. For example, transaction information may include or identify a card number, a card type, a service code, a posted amount, a disputed amount, a transaction date, a central processing date, a transaction type, a cardholder identification method, a unique identifier, and/or the like.

Additionally, or alternatively, the transaction information may include authorization information, such as a denied authorization identifier, a personal identification number (PIN), a presence identifier (e.g., indicating whether a cardholder was present for the transaction), a cardholder authentication verification value (CAVV) result identifier, a card verification value 2 (CVV2) result identifier, a partial/incorrect authorization identifier, and/or the like.

Additionally, or alternatively, the transaction information may include merchant information, such as a merchant country, a merchant name, a merchant category code, a legible imprint indicator (e.g., indicating whether a card imprint is considered legible), and/or the like. Additionally, or alternatively, the transaction information may include information associated with indicators, such as a network indicator, a point of sale (POS) entry mode indicator, a mail order/telephone order (MOTO) indicator, an electronic commerce indicator (ECI), a card presence or counterfeit indicator, a terminal indicator, a terminal capability code, a chargeback rights indicator (CRI), a universal cardholder authentication field (UCAF) indicator, a floor limit indicator (e.g., indicating an amount of money above which a transaction must be authorized), and/or the like.

In some implementations, the first information may include chargeback information. For example, chargeback information may include a fraud dispute identifier, an identifier of an authorization denied by a customer, a counterfeit card identifier, an identifier of a card listed in an exception file, a fictitious report identifier, an invalid card number identifier, an identifier that the card is in possession of the cardholder at the time of fraud, a previous transaction flag, a cyclic redundancy check identifier, a cardholder participation identifier, an identifier of a legible imprint (e.g., a legible credit card imprint), an identifier of a valid cardholder signature with the merchant, an identifier that the cardholder does not recognize the transaction, an identifier that shipping cost is included, a report of an invalid/illegible/absent CVV2 by the customer, and/or the like.

As further shown in FIG. 4, process 400 may include processing the first information to generate a processed data set (block 420). For example, advisor platform 220 may process the first information to generate a processed dataset. Advisor platform 220 may process the first information to standardize formatting, to remove redundant information, to make the first information more amenable to natural language processing, and/or the like. By processing the first information, accuracy of analysis of the first information and/or generation of the machine learning-based model may be improved. Furthermore, storage resources that would otherwise be used to store extraneous information may be conserved, and processor resources that would otherwise be used to In some implementations, advisor platform 220 may perform natural language processing on the data. For example, advisor platform 220 may identify keywords and/or extract features of the first information that are relevant to training the model and determining a classification. Additionally, or alternatively, advisor platform 220 may generate a structured representation of natural language included in the first information. By performing natural language processing on the first information, advisor platform 220 enables usage of natural language as an input for the model, which improves versatility and reduces reliance on human operators. Thus, costs are reduced and accuracy of the model is improved. Furthermore, natural language processing may improve flexibility of advisor platform 220 and may reduce an amount of preprocessing required to convert the natural language into usable information, thereby conserving processor resources.

In some implementations, advisor platform 220 may cleanse the information. For example, advisor platform 220 may remove particular characters (e.g., non-American Standard Code for Information Interchange (ASCII) characters), leading or trailing whitespaces, and/or the like. In some implementations, advisor platform 220 may standardize a data format (e.g., dates, location names, phone numbers, addresses, etc.), may structure data, may assign flags for particular types of data, may process the data to make the data a valid input for a machine learning process, and/or the like.

As further shown in FIG. 4, process 400 may include training a machine learning-based model, using the processed data set, to perform classification of the set of chargebacks (block 430). For example, advisor platform 220 may train a machine learning-based model using the processed data set. In this case, the model may receive, as input, transaction information and chargeback information for a set of chargebacks. The model may output information identifying proposed classifications of the set of chargebacks. In some implementations, the model may output one classification (e.g., reason code) per chargeback. Additionally, or alternatively, the model may output multiple classifications per chargeback (e.g., for selection by a user of a best classification for each chargeback). In some aspects, advisor platform 220 may receive the model. For example, another device may train the model, and may provide the model for use by advisor platform 220. "Machine learning-based model" is used interchangeably herein with "model."

In some implementations, the model may output a confidence score with a classification. For example, the confidence score may indicate a level of confidence that the classification is accurate. Additionally, or alternatively, the model may output a single classification based on the single classification's confidence score satisfying a threshold. Additionally, or alternatively, the model may output a single classification based on the single classification's confidence score being the highest of the confidence scores generated, being higher than the next highest confidence score by at least a threshold amount, and/or the like. Additionally, or alternatively, the model might output multiple classifications based on the classifications' confidence scores satisfying a threshold, being the highest of the confidence scores generated, being higher than the next highest confidence score by at least a threshold amount and/or the like. In some implementations, advisor platform 220 may output information identifying the confidence score. Additionally, or alternatively, the confidence score may be used internally to advisor platform 220 to determine which classification to provide and/or output.

In some implementations, advisor platform 220 may perform a supervised learning technique to train the model. In this case, the output dataset for training (e.g., the classifications) may be specified. By performing a supervised learning technique, advisor platform 220 may improve accuracy of the training at the cost of increased manual input. In some implementations, advisor platform 220 may perform an unsupervised learning technique, wherein the output dataset is not specified. This may reduce manual interaction, but may require more generations of learning and/or a larger input dataset.

In some implementations, advisor platform 220 may use a logistic regression technique to train the model. The logistic regression technique may work well for predicting categorical outcomes, such as approving or rejecting a particular outcome, or approving or rejecting multinomial outcomes, such as an approve, reject, or wait list. The logistic regression technique may be vulnerable to overconfidence, and may train a model that have an artificially inflated predictive power as a result of sampling bias. In some implementations, advisor platform 220 may employ a LogisticRegressionmethod function of a Sklearn package to build the model for predictions.

In some implementations, advisor platform 220 may use a naïve Bayesian classifier technique to train the model. In this case, advisor platform 220 may build the model through a binary recursive partitioning process (e.g., an iterative process of splitting the data into partitions, and then splitting the data further on branches). In some implementations, advisor platform 220 may employ a decision tree classifier, such as a DecisionTreeClassifiermethod function of a Sklearn package, to perform predictions.

In some implementations, advisor platform 220 may use a support vector machine (SVM) classifier technique to train the model. The SVM classifier technique may use linear models to implement nonlinear class boundaries via a maximum margin hyperplane for greatest separation between classes. The SVM classifier technique may be less overfitting than other techniques and may be robust to noise. In some implementations, advisor platform 220 may employ a binary classifier. In this case, to do multiple class classification, pair wise classifications may be used. Depending on data size, the SVM classifier technique may be computationally expensive and slow relative to other approaches. In some implementations, advisor platform 220 may employ a Sklearn package to create a model.

In some implementations, advisor platform 220 may use another technique (e.g., an artificial neural network) or a combination of the above techniques and/or one or more other techniques to train the model.

In some implementations, advisor platform 220 may train the model based on regulatory information. In this case, the regulatory information may identify a set of regulations regarding chargebacks and/or rules for applying the set of regulations. For example, a regulation may identify one or more criteria based on which a classification is to be applied for particular transaction information or chargeback information. Advisor platform 220 may use rules determined according to the regulation to guide or configure the model. For example, advisor platform 220 may assign a particular weight to input information according to a rule associated with a regulation, or may determine that a particular input is associated with one or more possible outcomes according to a rule associated with a regulation. Training the model according to regulatory information may be more efficient than training a large number of human actors to apply the rules, and may lead to improved uniformity of application of the regulation. In this way, by training the model based on regulatory information, advisor platform 220 may reduce reliance on human operators who are familiar with regulatory information to classify chargebacks. Furthermore, the model may conserve processor and storage resources that would otherwise be used to run a more complex and inefficient rules-based or human-specified classification system.

As further shown in FIG. 4, process 400 may include receiving second information identifying a second set of transactions and a second set of chargebacks associated with the second set of transactions (block 440). For example, advisor platform 220 may receive second information. The second information may identify a second set of transactions and a second set of chargebacks associated with the second set of transactions. In some implementations, advisor platform 220 may receive the second information to determine classifications using the model and/or perform one or more actions with regard to the second set of chargebacks based on the classifications.

In some implementations, advisor platform 220 may receive the second information from a mobile app, a bank portal, a bank branch, a customer care system, a case management system, a bot command center, a card management system, and/or another existing system of record. Additionally, or alternatively, advisor platform 220 may receive the second information (e.g., a transaction log, claims history, etc.) from storage device 215, which may store a database of the second information. Additionally, or alternatively, advisor platform 220 may fetch the information from one or more raw data sources.

In some implementations, and as described above, advisor platform 220 may receive the second information as natural language. For example, advisor platform 220 may receive the second information as input to a chat bot, as a transcript of a voice recording, as a user-generated document, or in a similar natural-language form. In such a case, advisor platform 220 may process the second information using natural language processing. For example, advisor platform 220 may identify attributes or values of the second information based on linguistic objects in the second information, and may use the attributes or values as inputs to the model. In this way, advisor platform 220 improves versatility of the tool and reduces reliance on human processing of input data. Furthermore, the usage of natural language processing may conserve processor and/or storage resources that would otherwise be used to process natural language inputs in a more rigid rules-based or human-based fashion. In some implementations, advisor platform 220 may process the second information based on a machine learning technique, such as a Sklearn (e.g., Scikit-learn) technique and/or the like.

In some implementations, advisor platform 220 may perform data preparation and processing on the second information. For example, advisor platform 220 may identify keywords and/or extract features using natural language processing. As another example, advisor platform 220 may perform feature selection and transformation for input into the model (e.g., based on features that are used as input to the model, based on an input vector of the model, etc.). As still another example, advisor platform 220 may collate preprocessed data from different sources to a single source or data store (e.g., a storage module of advisor platform 220, a storage device 215, etc.).

As further shown in FIG. 4, process 400 may include determining a classification of the second set of chargebacks using the machine learning-based model and based on the second information (block 450). For example, advisor platform 220 may identify one or more classifications for each chargeback. In some implementations, advisor platform 220 may determine a classification using the model. In this case, the model may receive, as input, second information (e.g., processed second information) including transaction information and chargeback information. The model may output information identifying classifications. In some implementations, advisor platform 220 may identify one classification per chargeback. In some implementations, advisor platform 220 may identify multiple classifications (e.g., a most likely 3 classifications, a most likely 5 classifications, etc.). For example, advisor platform 220 may generate a list (e.g., a ranked list) of classifications for each chargeback. In some implementations, the list may be based on respective confidence scores of the chargebacks included in the list. For example, the classifications may be ranked according to the confidence scores. Additionally, or alternatively, a number of classifications included in the ranked list may be based on the confidence score (e.g., a classification may be included in the ranked list when a confidence score of the classification satisfies a threshold).

In some implementations, advisor platform 220 may determine a document cluster and/or cluster label based on the classification and/or natural language processing of the second information. For example, natural language processing may produce a document cluster of documents (e.g., transaction information and chargeback information) associated with a particular characteristic, such as mutual similarity or association with a particular classification. More specifically, advisor platform 220 may perform a dimensionality reduction to a minimum feature set of an input vector to determine a document cluster. Advisor platform 220 may assign a cluster label to the document cluster. The cluster label may describe the document cluster. For example, the cluster label may identify a classification of the document cluster, may identify a customer, retailer, and/or bank associated with the document cluster, and/or may indicate other information. By determining cluster labels for document clusters, advisor platform 220 may simplify interpretation of the classifications and/or second information by a human observer.

In some implementations, advisor platform 220 may identify a fraud pattern based on the second information. For example, the model may identify a pattern in the second information indicative of fraudulent activity associated with a payment card. As used herein, fraudulent activity may refer to activity by a malicious entity that has obtained or stolen card information of a cardholder. In some implementations, advisor platform 220 may train the model based on a fraud pattern. For example, the first information may include information indicating whether a chargeback is associated with fraudulent activity. Advisor platform 220 may train the model, using the first information, to output a classification indicating when a chargeback may be associated with fraudulent activity. In some implementations, advisor platform 220 may identify a fraud pattern based on a reason code assigned to the second information and/or based on the classification of the second information.

As further shown in FIG. 4, process 400 may include performing an action based on the classification (block 460). For example, advisor platform 220 may perform an action based on the classification. In some implementations, advisor platform 220 may perform an action to provide information identifying the classifications to a user. In this case, the user may select a best classification, and/or may provide feedback indicating an accuracy of the classification. In some implementations, advisor platform 220 may update the model using the feedback (e.g., using a supervised or unsupervised learning technique). In this way, advisor platform 220 improves accuracy of the model over time in a fashion that may not require explicit configuration of the model by a human.

In some implementations, advisor platform 220 may automatically perform an action with regard to a payment card associated with a chargeback. For example, advisor platform 220 may cancel the card, freeze credit associated with the card, perform a fraud alert related to the card, and/or the like. In some implementations, advisor platform 220 may perform an action to provide information to a vendor or customer. For example, advisor platform 220 may provide information indicating a resolution of a chargeback, information identifying a customer, and/or the like.

In some implementations, advisor platform 220 may perform an action to generate a visualization based on the classifications. For example, the visualization may identify classifications of particular chargebacks or groups of chargebacks. As a specific example, the visualization may identify attributes of the chargebacks that contributed to the classification. As another example, the visualization may identify document clusters and/or cluster labels that are generated using the second information. The cluster labels may identify the classifications and/or information identifying a source of the documents of the document cluster. In this way, advisor platform 220 simplifies interpretation of classification data.

In some implementations, advisor platform 220 may analyze outputs of the model to identify a trend. For example, a trend may relate to a number of chargebacks associated with a particular cardholder, a number of chargebacks associated with a particular merchant or bank, a particular type of chargeback which is associated with an unusually high rate of occurrence, an increase in chargebacks over time, a threshold number of fraudulent chargebacks associated with a particular entity (e.g., a fraudster, a merchant with inadequate data security, etc.), and/or the like. In other words, advisor platform 220 may identify a trend based on a correlation between two or more data points in input information (e.g., first information and second information) of the model and output information (e.g., classifications regarding chargebacks identified by the first information and/or the second information).

In some implementations, advisor platform 220 may perform an action based on identifying a trend. For example, advisor platform 220 may identify a party associated with a trend, and may provide information regarding the party (e.g., to the party, to an administrator, to a supervisor of advisor platform 220). As another example, advisor platform 220 may automatically perform an action with regard to a merchant, card, or customer (e.g., may revoke authorization for the merchant, may put a hold on the card, may cause an investigation of the customer, etc.). Additionally, or alternatively, advisor platform 220 may perform a combination of the above actions and/or other actions. In this way, advisor platform 220 may identify trends based on millions, billions, or trillions of data points, which enables identification of trends that would be difficult or impossible for a human actor, and which improves efficiency of analysis of the input data. Furthermore, advisor platform 220 provides for identification of trends based on natural language input information, which improves accuracy of trend identification and which enables analysis of types of information that were previously inaccessible to classification systems.

In this way, advisor platform 220 trains a model using transaction information, chargeback information, and/or regulatory information regarding a set of chargebacks. Advisor platform 220 may train and/or update the model based on a machine learning technique or a similar technique, which improves accuracy of the model over time and which reduces human intervention in comparison to a system in which rules for assigning classifications are defined by a human actor. Furthermore, using the model to assign classifications may reduce subjectivity and improve processing speed for classification of chargebacks, which may reduce chargeback pendency and save organizational resources. Still further, the model may take into account a larger body of information than a human actor can analyze objectively when determining a classification, which may increase accuracy of the classification and which may further reduce human intervention in the classification process.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
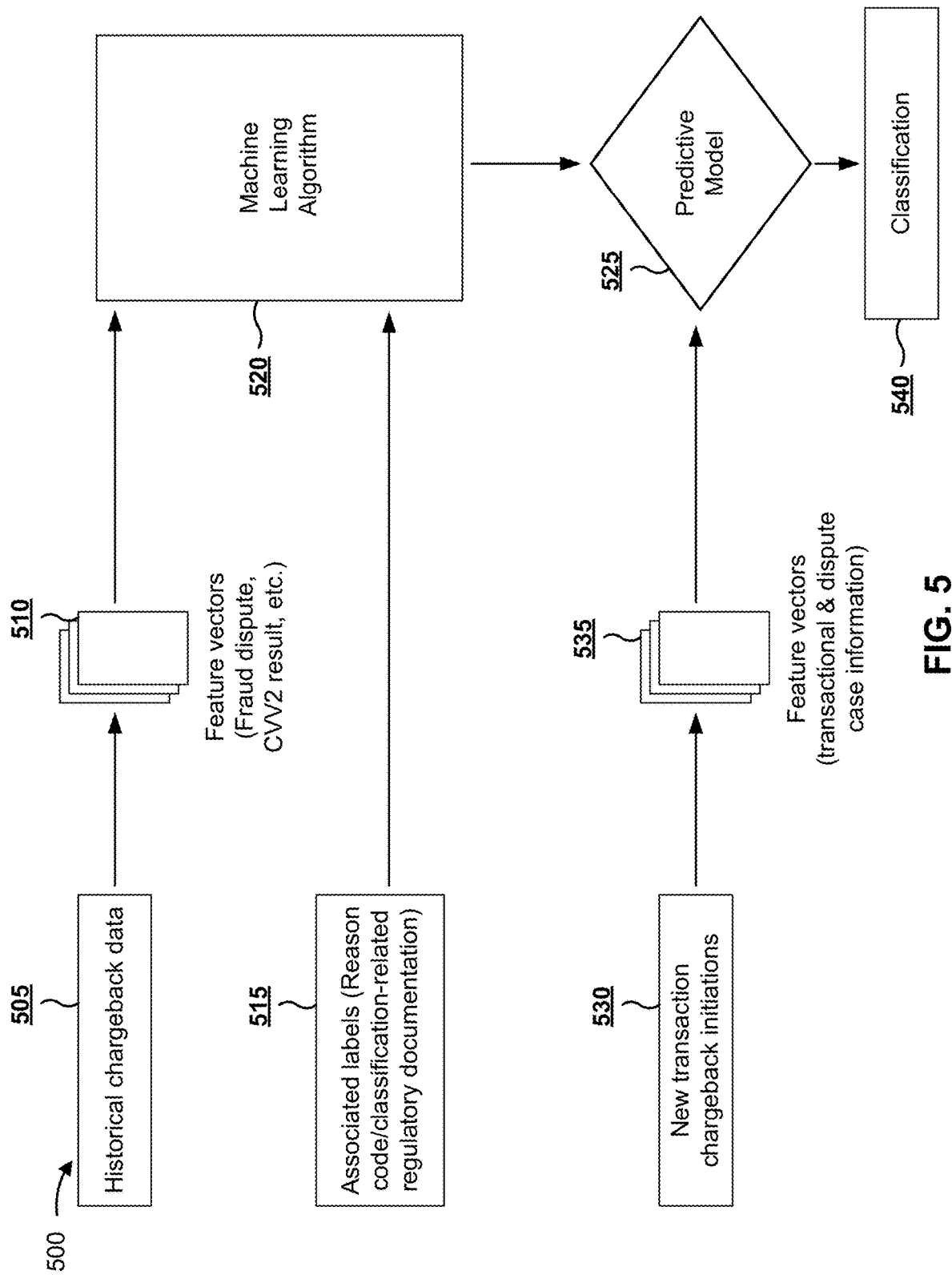
FIG. 5 is a diagram of an example implementation of a model for determining classifications of chargebacks.

FIG. 5 is a diagram of an example implementation 500 of a model for determining classifications of chargebacks. As shown in FIG. 5, and as shown by reference number 505, advisor platform 220 may receive historical chargeback data relating to transactions, chargebacks, and classifications associated with the transactions. For example, the historical chargeback information may include the first information described in more detail in connection with FIGS. 1A, 1B, and 4, above. As shown by reference number 510, advisor platform 220 may process the historical chargeback data to identify feature vectors (e.g., fraud dispute, CVV2 result, etc.). A feature vector may include a set of values configured as input for a model.

As shown by reference number 515, advisor platform 220 may receive regulatory information, such as associated labels or rules for determining classifications of the historical chargeback data (e.g., reason codes, classification-related regulatory documentation, etc.). As shown by reference number 520, advisor platform 220 may perform a machine learning algorithm that takes into account the regulatory information regarding classifications to generate a predictive model. The predictive model is shown by reference number 525.

As further shown in FIG. 5, and as shown by reference number 530, advisor platform 220 may receive information associated with chargebacks. For example, the information associated with the new chargeback initiations may include the second information described in connection with FIGS. 1A, 1B, and 4, above. As shown by reference number 535, advisor platform 220 may perform natural language processing to identify feature vectors (e.g., transactional and dispute case information, transaction information, chargeback information, etc.) based on the information associated with the new chargeback initiations, and may provide the information associated with new chargeback initiations to the predictive model. As shown by reference number 540, the predictive model may output a classification based on the information associated with the new chargeback initiations.

As indicated above, FIG. 5 is provided as an example. Other examples are possible and may differ from what was described with regard to FIG. 5. For example, the predictive model may be trained using additional or other information than the information 505/515, and may receive input information in addition to or other than the information 530/535. Additionally, or alternatively, the predictive model may output information other than or in addition to a classification.

Figure 6:
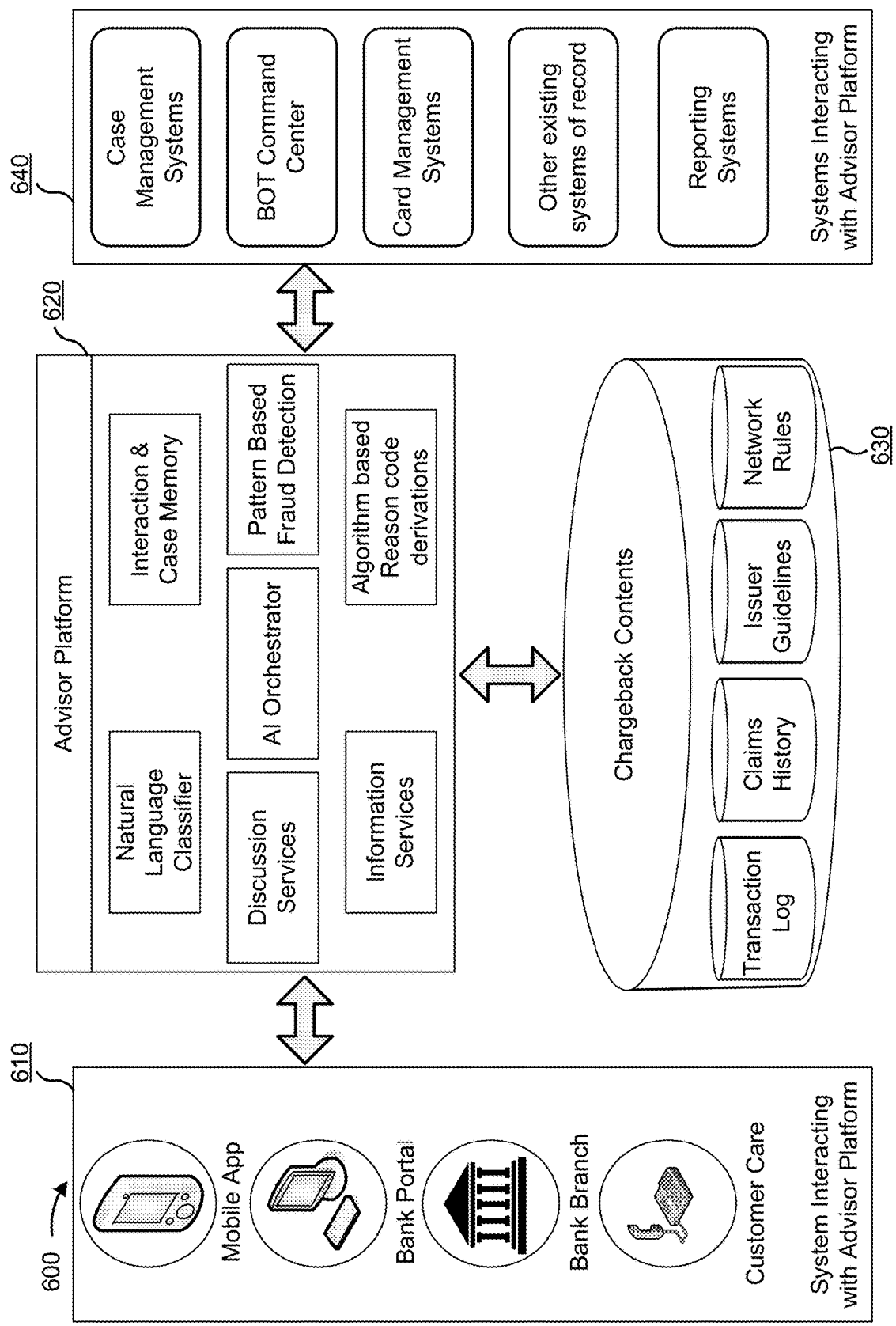
FIG. 6 is a diagram of example modules of an advisor platform.

FIG. 6 is a diagram of example modules 600 of an advisor platform, such as advisor platform 220. As shown in FIG. 6, and as shown by reference number 610, advisor platform 220 may interact with various systems to obtain first information and/or second information related to transactions and chargebacks associated with the transactions, as described herein. For example, systems that may interact with advisor platform 220 may include a mobile app, a bank portal, a bank branch, a customer care system, and/or the like.

As further shown in FIG. 6, and as shown by reference number 620, advisor platform 220 may include a natural language classifier module, an interaction and case memory module, a discussion services module, an artificial intelligence (AI) orchestrator module, a pattern based fraud detection module, an information services module, an algorithm based reason code derivation module, and/or the like. The natural language classifier module may process natural language for input to a model. The interaction and case memory module may provide memory for interactions (e.g., user interactions) regarding cases (e.g., active chargebacks, etc.). The discussion services module may provide an interface between a natural language user input (e.g., a chat bot, etc.) and advisor platform 220. The information services module may perform operations related to obtaining and processing input information. The pattern based fraud detection module may identify an indication of fraud based on a pattern in input information (e.g., first information and/or second information). The algorithm based reason code derivation module may determine a classification based on input information. For example, the algorithm based reason code derivation module may be a module of the model or may be the model. The AI orchestrator may configure communications between the modules of advisor platform 220.

As further shown in FIG. 6, and as shown by reference number 630, storage device 215 may store chargeback contents related to the chargebacks associated with the transactions, as described herein. The chargeback contents may include a transaction log, claims history, issuer guidelines, network rules, and/or the like. For example, the chargeback contents may include millions of data points, billions of data points, trillions of data points, and/or the like.

As further shown in FIG. 6, and as shown by reference number 640, advisor platform 220 may interact with various systems such as to perform actions based on classification of the chargebacks by advisor platform 220. For example, the systems may include case management systems, a BOT command center (e.g., for chat bots and/or the like), card management systems, other existing systems of record, reporting systems, and/or the like. As one example, advisor platform 220 may obtain transaction information and/or chargeback information for particular cases from the case management system. As another example, advisor platform 230 may interface with the BOT command center to obtain natural language input regarding chargebacks and/or transactions. As a third example, advisor platform 230 may interact with a card management system to obtain transaction information for one or more transactions associated with a chargeback. As yet another example, advisor platform 230 may interact with a reporting system to obtain reporting information for input to the model.

As indicated above, FIG. 6 is provided as an example. Other examples are possible and may differ from what was described with regard to FIG. 6.

In this way, a rigorous and automatic approach is used to perform evaluation and classification of chargebacks, which improves efficiency and accuracy of classification of chargebacks. Furthermore, using automated and computer-based techniques enables the identification of trends, correlations, and relationships between data regarding chargebacks, which may provide for identification of fraudulent activities that a human reviewer may have difficulty identifying. Still further, the usage of machine learning enables continuous improvement of processing techniques, which improves adaptability of implementations described herein in the face of changing chargeback characteristics and regulations. Furthermore, some implementations described herein may perform processing for large volumes of data (e.g., millions, billions trillions, etc. of data points) and may efficiently process the data, thereby conserving processing resources and processing volumes of data that may be inefficient or impossible for a human actor to objectively process.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors configured to:
      receive first information relating to a first set of transactions and a first set of chargebacks associated with the first set of transactions;
      process the first information to generate a processed data set,
         where the processing includes performing natural language processing of the first information;
      generate a training set, a validation set, and a test data set using the processed data set;
      train a model, based on the training set, the validation set, and the test data set, to perform classification of the first set of chargebacks by:
         identifying a set of regulations regarding the first set of chargebacks,
         assigning a particular weight to the processed data set according to a rule associated with the set of regulations, and applying a particular classification to a particular chargeback, of the first set of chargebacks, based on the particular weight;
receive second information identifying a second set of transactions and a second set of chargebacks associated with the second set of transactions,
where the second information is received from multiple, different sources;
determine a classification of the second set of chargebacks using the model and based on the second information,
where the model is configured to:
receive the second information as input,
generate a confidence score that indicates a level of confidence in the classification for the second set of chargebacks,
determine whether the confidence score satisfies a threshold, and
output the classification of the second set of chargebacks when the confidence score satisfies the threshold;
automatically analyze the classification of the second set of chargebacks from the model to identify a trend, the trend relating to a threshold number of fraudulent chargebacks; and
automatically perform an action based on the classification of the second set of chargebacks and based on identifying the trend,
where the one or more processors, when performing the action, are configured to:
update the model based on the classification of the second set of chargebacks to enable continuous improvements of the model, and
provide information indicating a resolution of a chargeback from the second set of chargebacks.

2. The device of claim 1, where the one or more processors are further configured to:
process the second information,
where, when processing the second information, the one or more processors perform at least one of:
identify keywords of the second information,
extract features of the second information,
format the keywords or features of the second information, or
combine preprocessed data from different sources to generate the second information.

3. The device of claim 1, where the one or more processors, when determining the classification, are configured to:
perform a dimensionality reduction on the second information to determine a minimum feature set associated with a cluster, where the cluster is based on the second information; and
determine the classification based on a label associated with the cluster.

4. The device of claim 1, where the model is trained using a machine learning approach.

5. The device of claim 4, where the machine learning approach is based on at least one of:
a logistic regression,
a naïve Bayesian classifier,
a decision tree classifier, or
a support vector machine (SVM) classifier.

6. The device of claim 1, where the one or more processors, when performing the action, are further configured to:
generate a visualization based on at least one of the second information or the classification of the second set of chargebacks.

7. A method, comprising:
receiving, by a device, first information relating to a set of transactions and one or more chargebacks associated with the set of transactions,
where the first information is received from multiple, different sources;
processing, by the device, the first information to generate a processed data set,
where the processing includes performing natural language processing of the first information;
generating, by the device, a training set, a validation set, and a test data set using the processed data set;
training, by the device, a model to perform classification of the one or more chargebacks based on the training set, the validation set, and the test data set, by identifying a set of regulations regarding the one or more chargebacks;
assigning a particular weight to the processed data set according to a rule associated with the set of regulations, and applying a particular classification to a particular chargeback, of the one or more chargebacks, based on the particular weight;
receiving, by the device, second information identifying a second set of transactions and a second set of chargebacks associated with the second set of transactions;
determining, by the device, a classification of the second set of chargebacks using the model,
where the model is configured to:
receive the second information as input,
generate a confidence score that indicates a level of confidence in the classification for the second set of chargebacks,
determine whether the confidence score satisfies a threshold, and
output the classification of the second set of chargebacks when the confidence score satisfies the threshold;
automatically analyzing, by the device, the classification of the second set of chargebacks from the model to identify a trend,
the trend relating to a threshold number of fraudulent chargebacks; and
automatically performing, by the device, an action based on the classification of the second set of chargebacks and based on identifying the trend,
where performing the action comprises:
updating the model based on the classification of the second set of chargebacks to enable continuous improvements of the model, and
providing information indicating a resolution of the second set of chargebacks.

8. The method of claim 7, where the first information relating to the set of transactions and the one or more chargebacks includes at least one of:
authorization information indicating whether a transaction was authorized,
information relating to whether the transaction or the one or more chargebacks were fraudulent, or
information identifying a merchant associated with the transaction.

9. The method of claim 7, where the classification of the second set of chargebacks is associated with a reason for the second set of chargebacks.

10. The method of claim 7, where the action includes generating a visualization of the classification of the second set of chargebacks.

11. The method of claim 7, where the action includes reporting the classification of the second set of chargebacks.

12. The method of claim 7, where the action includes automatically granting or denying the classification of the second set of chargebacks.

13. A cloud computing platform, comprising:
one or more devices configured to:
receive first information relating to a first set of transactions and a first set of chargebacks associated with the first set of transactions,
where the first information is received from multiple, different sources;
process the first information to generate a processed data set,
where the processing includes performing natural language processing of the first information;
generate a training set, a validation set, and a test data set using the processed data set;
train a model, based on the training set, the validation set, and the test data set, to perform classification of the first set of chargebacks by:
identifying a set of regulations regarding the first set of chargebacks,
assigning a particular weight to the processed data set according to a rule associated with the set of regulations, and
applying a particular classification to a particular chargeback, of the first set of chargebacks, based on the particular weight;
receive second information identifying a second set of transactions and a second set of chargebacks associated with the second set of transactions;
determine a classification of the second set of chargebacks using the model and based on the second information,
where the model is configured to:
receive the second information as input,
generate a confidence score that indicates a level of confidence in the classification for the second set of chargebacks,
determine whether the confidence score satisfies a threshold, and
output the classification of the second set of chargebacks when the confidence score satisfies the threshold;
automatically analyze the classification of the second set of chargebacks from the model to identify a trend, the trend relating to a threshold number of fraudulent chargebacks; and
automatically perform an action based on the classification of the second set of chargebacks and based on identifying the trend,
where the one or more devices, when performing the action, are configured to:
update the model based on the classification of the second set of chargebacks to enable continuous improvements of the model, and
provide information indicating a resolution of a chargeback from the second set of chargebacks.

14. The cloud computing platform of claim 13, where the model is trained using an unsupervised learning technique.

15. The cloud computing platform of claim 13, where at least part of the second information regarding the second set of chargebacks is received via user input.

16. The cloud computing platform of claim 15, where the one or more devices, when processing the first information, are configured to:
extract features from the first information using natural language processing,
where the classification of the second set of chargebacks is determined based on the features.

17. The method of claim 7, further comprising:
identifying a fraud pattern based on a reason code assigned to the second information.

18. The cloud computing platform of claim 13, where the one or more devices are further configured to:
identify a fraud pattern based on a reason code assigned to the second information and based on the classification of the second information.

19. The device of claim 1, wherein the first information includes an identifier that a card is possessed by a cardholder at a time of fraud.

20. The cloud computing platform of claim 13, where the one or more devices, when performing the action, are configured to:
generate a visualization based on at least one of the second information or the classification of the second set of chargebacks.

* * * * *